Sept. 8, 1959    J. C. HAWKINS ET AL    2,902,997
PEANUT STRIPPER
Filed Aug. 22, 1956
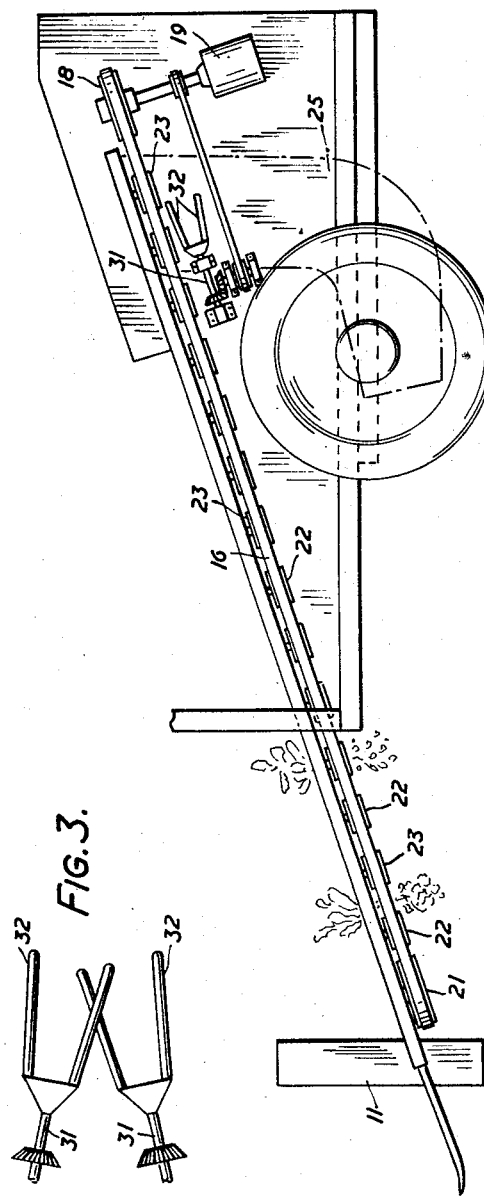
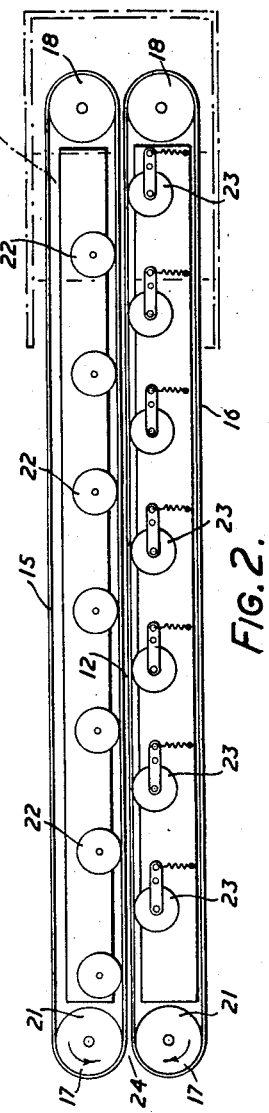
INVENTORS
JOHN C. HAWKINS.
JOHN F. McCLOY.
ROBERT J. OFIELD.
BY Watson, Cole, Grindle &
Watson    ATTORNEYS United States Patent Office 2,902,997
Patented Sept. 8, 1959

2,902,997
PEANUT STRIPPER

John Clement Hawkins, Clophill, England, John Frederic McCloy, Nairobi, Kenya, East Africa, and Robert John Ofield, Silsoe, England, assignors to National Research Development Corporation, London, England, a British corporation Application August 22, 1956, Serial No. 605,529

6 Claims. (Cl. 130—30)

This invention relates to apparatus for separating groundnuts such as peanuts and the like from the parent plant including means for gripping and conveying the plants by their foliage for example by means of two belts travelling in unison and between which the foliage is gripped and separating or stripping apparatus which acts on the plants while they are so gripped in such a manner as to separate the ground nuts or the like from them.

Thus the invention may be applied to apparatus for separating groundnuts and the like from the parent plant of the general kind described in British patent specification No. 748,547.

One object of the present invention is to provide improved means for separating the groundnuts or the like from the parent plant without also removing too much haulm and rubbish.

In accordance with the present invention, apparatus for separating groundnuts or the like comprise two parts lying on opposite sides of and forming between them a slot like space into which the roots of the plant are fed by conveying apparatus, at least one side of the slot like space being bounded by a rotating beater having ribs or arms which beat and strip the ground nuts or the like from the gynophors of the plant as the gynophors pass through the space.

Thus, the axis of rotation of the beater may have a substantial component parallel with the direction in which the gynophors move through the space.

The ribs or arms may extend in the general direction in which the gynophors move through the space, and thus can cause the slot-like space to be long enough to remove substantially all of the groundnuts.

However, preferably the ribs or arms are at acute angles to the axis of the rotation of the beater, and diverge from it in the direction which the gynophors move so that the blows delivered to the gynophors and nuts by the beater will increase in strength as the gynophors move through the space.

Preferably the side of the slot like space opposite the said one side is bounded by a similar rotating beater of which the ribs or arms enter the spaces between the ribs or arms on the first beater so that the gynophors are beaten by ribs or arms alternately from each beater.

In this way the roots and nuts will be struck alternately from opposite sides and more effective separation may be achieved.

The axis of rotation of the or each beater may be inclined to and converge on the direction in which the roots move through the slot like space so that the space will have a convergent lead-in portion facilitating the entry of the roots.

The invention may be carried into practice in various ways, and one specific embodiment together with a modification will be described by way of example with reference to the accompanying drawings of which Figure 1 is an elevation of a groundnut or peanut harvester apparatus incorporating a rotary beater for removing the groundnuts from the roots of the parent plant.

Figure 2 is a plan view of the apparatus shown in Figure 1, and

Figure 3 is a detailed view to a larger scale of part of Figure 2 showing the disposition of the rotary beaters.

The general construction of the harvesting machine is described in British patent specification No. 748,547 and as it does not form a part of the subject of the present invention it will not be described here.

It will suffice to say that a share bow or plow 11 removes the crops from the soil and feeds them into a passage 12 formed between two adjacent sides 13 and 14 of a pair of belts 15 and 16 which rotate in opposite directions as shown by the arrows 17 in Figure 2 by being driven at their ends remote from the share bow 11 by pulleys 18 driven by any convenient mechanism 19 which may for example be driven by the motor of a tractor pulling the harvester.

The belts run around free pulleys 21 at their lower ends and the sides 13 and 14 are held close together on either side of the passage 12 by means of a number of fixed pulleys 22 in contact with the belt 15 and a number of pivotally mounted spring loaded pulleys 23 in contact with the belt 16. Each of the pulleys 22 is opposite a space between adjacent pulleys 23, as can be seen in Figure 2 and as clearly described in British patent specification No. 748,547.

The belts 15 and 16 are inclined upwardly from the share bow 11 and as crops are fed into the convergent inlet 24 they are lifted as they pass along the passage 12 due to the rotation of the belts 15 and 16 until they are brought over a receptable 25. It is desired to remove the groundnuts at this position so that they drop into the receptacle 25 while the remainder of the plants can travel out from the upper end of the passage 12 to another receptacle (not shown).

The present invention is concerned with the mechanism for removing the groundnuts from the gynophors of the parent plants as they pass over the receptacle 25. This is achieved by means of a pair of rotary beaters, each in the shape of a Y consisting of a driving shaft 31 forming the leg of the Y and two circular beater arms 32 forming the arms of the Y.

The shaft 31 carries a pulley 33 which is driven by means shown generally at 34, for example gearing driven from the mechanism 19.

As can be seen best from Figure 3, the two driving shafts 31 converge on the vertical plane through the direction of movement of plants through the passage 12 and since the arms 32 diverge from the axis of the shafts 31 as they rotate, they will deliver to the gynophors which dangle below the belts 15 and 16 blows of a severity which increases as the roots move further along the passage 12. As can be seen from Figure 1 the rotary beaters are mounted so that there is just clearance between their tops and the underside of the belts 15 and 16, while the arms 32 of the two beaters are arranged as they rotate to inter-leave, the arm of one beater being opposite the space between the two arms of the other.

Thus the two beaters may be said to define a slot like space through which the gynophors have to pass, the two sides of the space being provided respectively by the two beaters. As the gynophors pass through this slot like space they receive blows from the beater arms 32 alternately in one direction and the other; which blows act downwardly and tend to knock the peanuts from the gynophors into the receptacle 25.

From Figure 3 it can be seen that the convergence of the shafts 31 on to the vertical plane through the passage 12 provides a convergent inlet to the slot like passage which assists proper entry of the roots.

It will be clear that the most suitable form of the rotary beater will depend upon the type of crop, the type of soil, the weather conditions, the characteristics of the harvester and surrounding conditions generally, but one form of apparatus that has been found to be successful in harvesting groundnuts has the following particulars.

The divergence of the rotary beaters is from 7" maximum diameter at the inlet end to 11" diameter at the outlet end, and the convergence of the centres of the rotary beaters is from 12" apart at the inlet end to 8" apart at the outlet end. Each beater has two diametrically opposed circular arms of 1⅜" diameter and 17" length.

The beaters rotate at 650 r.p.m. and the linear speed of the belts is 390 feet per minute.

The beaters are mounted with the upper arm 32 in its uppermost position parallel with and just clear of the lower side of the belt 15 or 16.

What we claim as our invention and desire to secure by Letters Patent is:

1. Apparatus for separating peanuts from parent plants having peanut-bearing gynophors, comprising a frame, a conveyer mounted on said frame for rectilinear movement to convey the plants along a rectilinear path with their gynophors dangling and two beater elements rotatably mounted on said frame beneath said conveyer and arranged opposite one another on opposite sides of a vertical plane which includes said path, each rotary beater element comprising a shaft mounted for rotation on said frame about an axis generally parallel to said path and at least one bar secured to said shaft for rotation therewith, and means operatively connected to said shafts for rotating the said shafts in opposite directions with their relatively adjacent sides moving downwardly, the bars of each shaft extending generally in the same direction as said shaft and arranged at such an angle on its shaft that the surfaces of revolution defined by the bars of the respective shafts define between them a passage along which the gynophors are conveyed by said conveyer and which converges in the direction of movement of the conveyer.

2. Apparatus as defined in claim 1, including means interconnecting the said shafts for coordinated rotation, said bars being angularly positioned about the rotational axes of their respective shafts to alternately rotate through a point midway between the said shafts.

3. Apparatus as claimed in claim 1 in which said bars are at acute angles to the axes of rotation of said beater elements.

4. Apparatus as claimed in claim 3 in which each said beater element has two symmetrically disposed bars.

5. Apparatus as claimed in claim 1 in which the axes of rotation of said beater elements are inclined to and converge in the direction in which said conveyor moves.

6. Apparatus as claimed in claim 1 in which said conveyer means comprises a pair of belts having adjoining parallel runs moving in the same direction to define between them a passage extending above said beater elements through which passage plants gripped between the said runs are delivered with their gynophors dangling between said beater elements.

References Cited in the file of this patent
UNITED STATES PATENTS

| | | |
|---|---|---|
| 520,902 | Smethurst | June 5, 1894 |
| 798,305 | Smith | Aug. 29, 1905 |
| 944,945 | Calkins | Dec. 28, 1909 |
| 2,536,927 | Griswold | Jan. 2, 1951 |
| 2,550,129 | Urschel | Apr. 24, 1951 |